April 26, 1966         A. RICHNER         3,247,875
KITCHEN SIEVE FOR SIEVING BOILED VEGETABLES AND THE LIKE
Filed Nov. 5, 1963
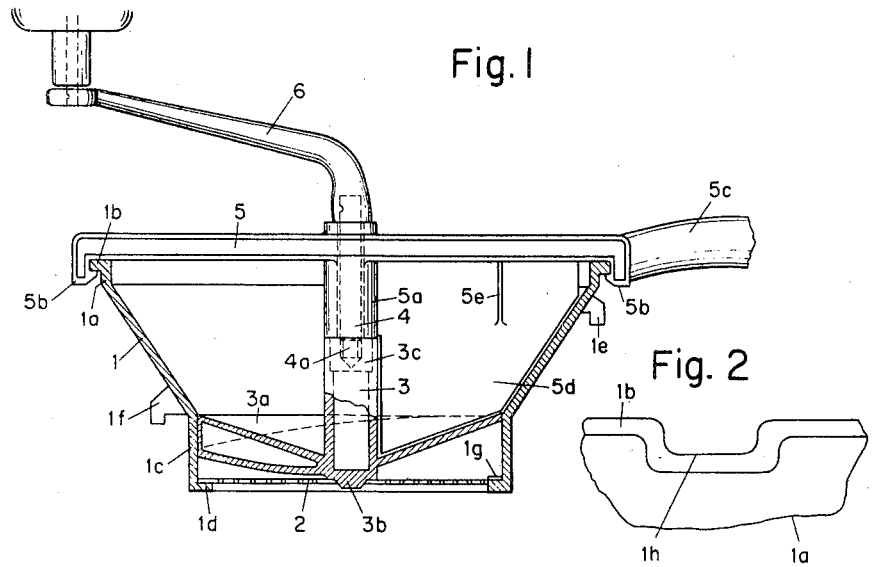
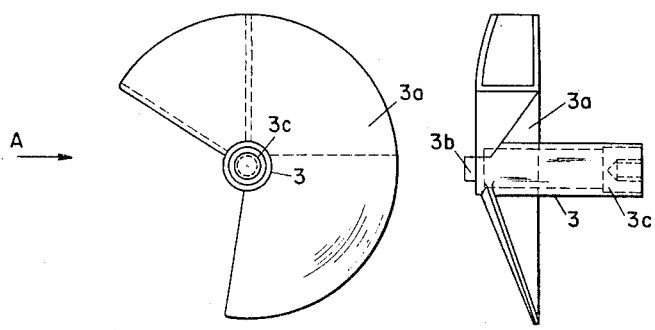
Inventor
Arthur Richner
by
Michael J. Striker
Atty

United States Patent Office 3,247,875
Patented Apr. 26, 1966

3,247,875
KITCHEN SIEVE FOR SIEVING BOILED
VEGETABLES AND THE LIKE
Arthur Richner, Mönchhofstrasse 6, Kilchberg,
Zurich, Switzerland
Filed Nov. 5, 1963, Ser. No. 321,507
Claims priority, application Switzerland, Nov. 6, 1962,
13,036/62
5 Claims. (Cl. 146—175)

Sieves for boiled vegetable foods and the like are already known with a conical casing which tapers in the downward direction and which is bridged by a cross-member which is detachably secured to the top edge of the casing and in the centre of which is mounted a vertical shaft, the top end of which is provided with a hand crank. The casing is closed at the bottom by an interchangeable sieve element in the form of a flat, conical or corrugated, perforated or slotted disc. Above the latter is provided a segmental pressure plate which partially covers the sieve element, is bent up at one end, is mounted at the bottom end of the shaft, and forces the food fed into the casing through the sieve element when the said pressure plate rotates. The disadvantage of these known sieves is that the pressure plate and the sieve element operate satisfactorily only at their peripheral regions, while the pressure operative on the food in the central region is insufficient to force the food through the sieve element. The food therefore conglomerates in the central region between the pressure plate and the sieve element and clogs the latter. The invention obviates this disadvantage.

An object of the present invention is to provide a kitchen sieve designed in such a way that the food is pressed through all parts of the sieve element substantially uniformly.

According to the invention there is provided a kitchen sieve for sieving boiled vegetables and like foodstuffs comprising a casing having open upper and lower ends and having an inside surface shaped as a surface of revolution at least the greater part of which tapers in the downward direction, a cross member spanning the upper end, means for preventing the cross member rotating with respect to the casing, a shaft journalled in the cross member and centrally and axially disposed with respect to the casing, drive means connected with the upper end of the shaft, a sieve element removably fixed against downward and rotary movement in the lower end of the casing, and having a flat upper surface, a pressure element secured to the lower end of the shaft the pressure element comprising a hub and a blade rigid with the hub and extending radially from the hub to the inner surface and extending circumferentially to cover at least three-quarters of the area of the upper surface of the sieve element so as to leave a sector of the later surface exposed, the pressure element having an upper surface shaped as a downwardly tapering surface of revolution and a lower surface of helical shape, the lowest extremity of the latter lower surface being approximately parallel to and disposed immediately above the upper surface of the sieve element, the sieve comprising also a stripper wall rigid with the cross member and extending in the axial and radial directions to abut the hub, the inside surface of the casing and the upper surface of the pressure element so as to sweep the upper surface of the pressure element when the latter is rotated.

The said construction of the pressure element, or its underside, has the effect that the pressure exerted on the food is substantially evqual from inside to out and the pressure element and the sieve element operate uniformly over their entire areas, so that the capacity of this sieve is much higher than that of known sieves. The sieved food has a uniform particle size and perfect appearance.

The invention is more particularly described with reference to an embodiment illustrated in the accompanying drawing, in which:

FIGURE 1 is an axial section through a kitchen sieve in accordance with the invention;

FIGURE 2 is an elevation of part of the top edge of the casing of the sieve;

FIGURE 3 is a plan view and

FIGURE 4 is an elevation of the pressure element of the sieve viewed in the direction of the arow A in FIGURE 3.

The sieve illustrated for sieving boiled vegetable foods, such as potatoes, spinach, cereals, dough and the like, comprises a part conical casing 1, which is open top and bottom and which has a right cylindrical edge part 1a with an outwardly projecting flange 1b at the top, and a right cylindrical extension 1c with an inwardly directed flange 1d at the bottom. On the outside of the conical casing 1, beneath the edge part 1a and above the extension 1c, are pairs of hook-shaped supporting elements 1e and 1f respectively.

A sieve element 2, a perforated disc in the example illustrated, is disposed on the flange 1d of the cylindrical extension 1c and is secured against rotation by a lug 1g, which is provided on the flange 1d and which engages in a recess provided in the edge of the sieve element 2. A pressure element is fitted into the cylindrical extension 1c and consists of a cylindrical hollow hub 3 and a blade 3a which is disposed on said hub and which covers substantially more than three-quarters of the upper surface area of the sieve element 2, but which leaves part of this upper surface exposed. The top of the blade 3a is of downwardly tapering conical shape and its peripheral edge is level with the top edge of the cylindrical extension 1c. The underside of the blade 3a comprises a helical surface, the lower radial edge of which is approximately parallel to the sieve element 2 and is situated immediately above the latter. At its lower closed end the hub 3 has a guide extension 3b guided in a central aperture in the sieve element 2. A screwthreaded bush 3c is fixed in the top end of the hollow hub 3 and a screw-threaded extension 4a disposed at the bottom end of a vertical shaft 4 is screwed into said bush. Shaft 4 is mounted in a bearing 5a on the underside of a cross member 5 diametrically bridging the edge part 1a of the casing 1 and its end projecting beyond said cross member 5 carries a drive device, a hand crank 6 in the example illustrated. The latter could be replaced by an electric motor which is disposed in or on the cross member 5 and which drives the shaft 4 by way of a reduction gear. Cross member 5 lies in two diametrically opposite notches 1h provided in flange 1b and its underside has two claws 5b which engage beneath the flange 1b in the notches 1h and thus secure the cross member 5 on the flange 1b of the edge part 1a of the casing 1. At one end the cross member 5 has a handle 5c. On the underside of the cross member 5 on one side of the shaft 4 is a vertical stripper wall 5d, whose bottom part extends on the inside as far as the hub 3 of the pressure element 3, 3a and whose top part extends on the outside as far as the casing 1. Between the vertical inner edge and the outer edge which is inclined to correspond to the conical part of the casing 1, the bottom edge of the stripper wall 5d has an inclination corresponding to the conical top of the blade 3a of the pressure element 3, 3a and on rotation of the pressure element 3, 3a sweeps over the top of said blade 3a in order to strip the food off the latter. The stripper wall 5d is advantageously stiffened by at least one rib 5e.

On rotation of the hand crank 6 and hence of the pressure element 3, 3a, the food introduced into the casing 1 for straining is stripped—if it does not directly arrive on the sieve element 2—by the non-rotating wall 5d from the hollow conical top of the blade 3a of the pressure element 3, 3a on to the part of the sieve element 2 not covered by the blade 3a. The food is engaged by the front edge of the blade 3a, which extends upwardly at an angle from inside to out, passes beneath the blade 3a and is forced by its helical underside on to the sieve element 2 and through the latter. As a result of the said construction of its underside, the pressure element 3, 3a exerts the same pressure on the food from inside to out so that the entire surfaces of the blade of the pressure element 3, 3a and of the sieve element 2 operate uniformly. The capacity of the sieve described is therefore much greater than that of known sieves in which only the peripheral part of the pressure element and of the sieve operate fully. Also the food does not conglomerate excessively anywhere and is therefore sieved uniformly and without any crushing which makes the sieved food look unattractive. Since the pressure element 3, 3a is fitted into the cylindrical extension 1c in the casing 1, there is no gap of any appreciable width between the top edge of the blade 3a and the top edge of the extension 1c and the food beneath the blade 3a cannot be forced out upwards during its rotation as is possible with known sieves. The capacity of the sieve described is thus further increased.

If the sieve is to be cleaned or its sieve element 2 changed, the hand crank 6 is rotated in the anticlockwise direction with the pressure element 3, 3a retained, so that the screwthreaded extension 4a of shaft 4 is unscrewed from bush 3c of hub 3 of pressure element 3, 3a. Cross member 5 together with shaft 4 can then be removed from the flange 1b of casing 1. The pressure element 3, 3a is then exposed and can be lifted out of the cylindrical extension 1c, whereupon the sieve element 2 is exposed and can be removed. The sieve is advantageously equipped with a set of sieve elements 2 with apertures of different diameters and/or different constructions or slots with cutting edges.

The casing 1 including its edge part 1a, flange 1b, extension 1c and flange 1d is advantageously made from plastics material capable of elastic deformation to a certain extent, for example polystyrene. The casing 1 can then be compressed to a certain extent in the direction of the notches 1h for fitting and removal of the cross member 5 so that the claws 5b can be engaged beneath or disengaged from the flange 1b. No special fastening means, for example a catch, are therefore required to secure the cross member 5 on the flange 1b of the casing 1. The cross member 5 with the bearing 5a, claws 5b and handle 5c advantageously consists of a hard plastics material, for example, polystyrene or a thermosetting resin; alternatively, it may be a metal. Since the handle 5c is mounted on the stable cross member 5, there is no load on the casing 1 and there is no danger of the handle breaking, as may be the case after considerable use with sieves in which the handle is mounted on the casing. The pressure element 3, 3a is also advantageously of a hard plastics material. Since solid parts cannot be made satisfactorily by injection moulding from plastics, the blade 3a of this pressure element 3, 3a is advantageously constructed as a hollow element at the places where it has a relatively considerable thickness, the cavity being divided if required into two or more chambers by a radial wall or a plurality of such walls, as will be seen in the drawing. The cavity is illustrated open at the periphery but it may alternatively be closed at the periphery.

The support members 1e are situated on either side of one notch, and the supporting members 1f are situated on either side of the other notch 1h of the flange 1b and enable the sieve to be supported on the edge of a pot, for example a saucepan, when in use. The supporting members 1e are used when the sieve is supported on the edge of a relatively large diameter pot, and the supporting members 1f when the sieve is supported on the edge of a smaller diameter or a flat utensil, for example a baking pan. The sieve may be supported at the handle side or on the opposite side if the cross member 5 is secured in a corresponding position on the flange 1b of the casing 1.

The sieve element 2 may also be provided with a downwardly directed edge to stiffen the sieve 2 and the latter can therefore be made of relatively thin sheet metal. This edge may be provided with serrations to engage complementary serrations on the flange 1d and thus secure the sieve 2 against rotation.

What I claim is:
1. A kitchen sieve for sieving boiled vegetables and like foodstuffs, comprising a casing of elastically deformable plastic material and having respective upper and lower ends and an inner surface shaped as a surface of revolution and comprising a frusto-conical upper portion and a right cylindrical lower portion, the upper end of said casing being formed with an outwardly directed flange provided with a pair of diametrically opposite notches in an upper surface thereof, and the lower end being formed with an inwardly directed flange, said casing further having an outer surface formed with a first pair of projecting support members positioned one on each side of one of said notches immediately below said outwardly directed flange, and with a second pair of projecting support members positioned diametrically opposite said first pair immediately above said right cylindrical portion of said inner surface; a cross member spanning said upper end of said casing; means, including a claw at opposite ends of said cross member, for preventing rotation of said cross member relative to said casing, said claws being adapted to be received in said notches and to hook under said outwardly directed flange, one of said claws having a handle secured to an outwardly directed face thereof; a shaft journaled in said cross member and centrally and axially disposed with respect to said casing; drive means connected with the upper end of said shaft; a sieve element removably secured in the lower end of said casing against axial and rotational movement, said sieve element resting on said inwardly directed flange and having a flat upper surface; a pressure element secured to the lower end of said shaft and positioned within the space surrounded by said cylindrical portion of said inner surface, said pressure element comprising a hub and a blade rigid with said hub and extending radially therefrom to said inner surface of said casing, and extending circumferentially to cover at least three-quarters of the area of said flat upper surface of said sieve element so as to leave a sector of said flat upper surface thereof exposed, said blade having a thick portion of hollow construction and being formed with an upper face shaped as a downwardly conical surface of revolution and a lower surface of helical shape, the lowest extremity of said lower surface being approximately parallel to and disposed immediately above said flat upper surface of said sieve element; and a stripper wall rigid with said cross member and extending axially and radially of said hub in abutting relationship with the latter, with said inner surface of said casing, and with said upper face of said pressure element, whereby to sweep said upper face of said blade when said pressure element is rotated.

2. A kitchen sieve for sieving boiled vegetables and like food stuffs comprising a casing having open upper and lower ends and having an upper edge formed with an outwardly directed flange having a pair of diametrically opposite notches formed therein; an outer surface formed with a first pair of projecting support members positioned one on each side of said notches immediately below said flange, and a second pair of projecting support members positioned diametrically opposite said first pair for supporting said sieve on a supporting structure; an inner surface shaped as a surface of revolution at least the greater part of which tapers in the downward direction; a cross member spanning said upper end and having respective end portions received in said pair of notches for preventing said cross member from rotating with respect to the casing; a shaft journalled in said cross member and centrally and axially disposed with respect to said casing; drive means connected with the upper end of said shaft; a sieve element removably fixed against downward and rotary movement in the lower end of said casing and having a flat upper surface; a pressure element secured to the lower end of said shaft, said pressure element comprising a hub and a blade rigid with said hub and extending radially from said hub to said inner surface and extending circumferentially to cover at least three-quarters of the area of said upper surface of said sieve element so as to leave a sector of the latter surface exposed, said pressure element having an upper surface shaped as a downwardly tapering surface of revolution and a lower surface of helical shape, the lowest extremity of the latter lower surface being approximately parallel to and disposed immediately above said upper surface of the sieve element, the sieve comprising also a stripper wall rigid with the said cross member and extending in the axial and radial directions to abut the hub as well as the inside surface of the casing and the upper surface of the pressure element, so as to sweep the upper surface of the pressure element when the latter is rotated.

3. A kitchen sieve according to claim 1 wherein the said sieve element comprises a downwardly projecting serrated rim and the said inwardly directed flange of the casing comprises complementary serrations adapted to engage between those of the sieve to prevent rotation of the sieve element.

4. A kitchen sieve according to claim 3 wherein the said drive means is a cranked handle.

5. A kitchen sieve according to claim 3 wherein the lower end of the said hub partly protrudes through and is partly supported by the said sieve element.

References Cited by the Examiner
FOREIGN PATENTS
763,105 2/1934 France.
192,542 12/1937 Switzerland.

ROBERT C. RIORDON, *Primary Examiner.*

J. SPENCER OVERHOLSER, *Examiner.*